(12) United States Patent
Yang

(10) Patent No.: US 7,515,665 B2
(45) Date of Patent: Apr. 7, 2009

(54) GFSK/GMSK DETECTOR WITH ENHANCED PERFORMANCE IN CO-CHANNEL INTERFERENCE AND AWGN CHANNELS

(75) Inventor: Ganning Yang, Irvine, CA (US)

(73) Assignee: Skyworks Solutions, Inc., Irvine, CA (US)

( * ) Notice: Subject to any disclaimer, the term of this patent is extended or adjusted under 35 U.S.C. 154(b) by 708 days.

(21) Appl. No.: 11/141,439

(22) Filed: May 31, 2005

(65) Prior Publication Data

US 2006/0268973 A1 Nov. 30, 2006

(51) Int. Cl.
H04L 7/00 (2006.01)
H04L 7/02 (2006.01)
H03D 3/24 (2006.01)

(52) U.S. Cl. .................. 375/354; 375/229; 375/359; 375/373; 375/371

(58) Field of Classification Search ......... 375/229–236, 375/240.02–240.07, 240.26–240.29, 354–355, 375/359, 371–376
See application file for complete search history.

(56) References Cited

U.S. PATENT DOCUMENTS

| 6,101,219 | A | 8/2000 | Perez Abadia et al. |
| 6,144,708 | A * | 11/2000 | Maruyama ............ 375/327 |
| 6,744,330 | B1 | 6/2004 | Jones et al. |
| 6,904,274 | B2 * | 6/2005 | Simmons et al. ....... 455/245.1 |
| 7,215,705 | B2 * | 5/2007 | Kravtsov ................ 375/233 |
| 2002/0061738 | A1 | 5/2002 | Simmons et al. |
| 2003/0043897 | A1 * | 3/2003 | Papanikolaou et al. ..... 375/229 |
| 2003/0165208 | A1 * | 9/2003 | Carter et al. ........... 375/373 |
| 2004/0190649 | A1 * | 9/2004 | Endres et al. .......... 375/326 |
| 2005/0047500 | A1 | 3/2005 | Gupta et al. |
| 2005/0135472 | A1 | 6/2005 | Higashino |

* cited by examiner

Primary Examiner—David C Payne
Assistant Examiner—Linda Wong

(57) ABSTRACT

A detector for detecting a received signal according to a Gaussian shift keying ("GFSK/GMSK") modulation scheme. The detector may enhance a detection performance of the receiver while limiting one or more implementation impacts. An implementation impact may include an implementation complexity impact, an implementation cost impact, or other impacts. The detection performance of the detector may be enhanced in relation to one or more performance aspects, such as, an ISI aspect, an AWGN aspect, a co-channel interference aspect, a sensitivity aspect, an error propagation aspect, or other aspects. The detector may be configured or reconfigured to enhance one or more particular performance aspects. The enhancement of the particular performance aspects may affect, adversely or otherwise, one or more related performance aspects that may be related to the particular performance aspects. The detector may be configured or reconfigured according to a current application of the detector.

10 Claims, 3 Drawing Sheets

GFSK/GMSK DETECTOR WITH ENHANCED PERFORMANCE IN CO-CHANNEL INTERFERENCE AND AWGN CHANNELS

FIELD OF THE INVENTION

The invention relates to a detector within a demodulation system for a wireless receiver that may provide enhanced performance with respect to both additive white Gaussian noise and co-channel interference, and may enable the sensitivity of the detector to be adjustably configured.

BACKGROUND OF THE INVENTION

In wireless applications, the performance of a receiver with respect to additive white Gaussian noise ("AWGN) may be related to a sensitivity of the receiver. The sensitivity of the receiver may also be related to a performance of the receiver with respect to co-channel interference. In a Gaussian shift keying modulation scheme system, the performance with respect to AWGN may be at least partially a function of a demodulation scheme. While in a similar system the performance with respect to co-channel interference may be at least partially a function of the demodulation scheme and an inter symbol interference ("ISI"). In such a system, pursuing an enhanced performance with respect to AWGN may degrade performance with respect to co-channel interference and vice versa.

In such systems, the performance of the receiver with respect to AWGN may be augmented by utilizing Maximum Likelihood Sequence Detection ("MLSE"). However, MLSE may not be utilized in a system with a variable modulation index, and MLSE implementation may be complex and costly, which may marginalize its employment in lower cost systems.

Similarly, Decision Feedback Equalization ("DFE") may provide enhanced performance with respect to co-channel interference by partially filtering ISI in a feedback manner. But DFE may not filter a suitable amount of ISI, and may result in error propagation, due to the feedback method of filtration.

Consequently, there may be a need for a demodulation system including a detector that may enhance performance with respect to AWGN and/or co-channel interference at a reasonable cost of implementation. Additionally, there may be a need for a demodulation system including a detector that may allow the sensitivity of the detector to be configured or reconfigured according to a current application.

SUMMARY

One aspect of the invention may be related to a detector for detecting a received signal according to a Gaussian shift keying ("GFSK/GMSK") modulation scheme. The detector may enhance a detection performance of the receiver while limiting one or more implementation impacts. An implementation impact may include an implementation complexity impact, an Implementation cost impact, or other impacts. The detection performance of the detector may be enhanced in relation to one or more performance aspects, such as, an ISI aspect, an AWGN aspect, a co-channel interference aspect, a sensitivity aspect, an error propagation aspect, or other aspects.

In some embodiments of the invention, the detector may be configured or reconfigured to enhance one or more particular performance aspects. The enhancement of the particular performance aspects may affect, adversely or otherwise, one or more related performance aspects that may be related to the particular performance aspects. The detector may be configured or reconfigured according to a current application of the detector. An application of the detector may include a voice application, a data application, a long-range application, a short-range application, or other applications.

According to various embodiments of the invention, the detector may acquire a received signal that may represent a string of symbols. The received signal may include an I component and a Q component. The detector may convert the received signal to a phase signal. The phase signal may be related to a phase differential between consecutive symbols in the received signal. The phase signal may be received by an equalizer. The equalizer may filter interference, such as ISI, or other interference, from the phase signal. By filtering interference from the phase signal, the equalizer may generate a filtered phase signal. The filtered phase signal may be received by a decision feedback data slicer. The decision feedback data slicer may combine the filtered phase signal with a feedback signal to generate a combined signal. The combined signal may be converted to a detected signal. The decision feedback data slicer may include a feedback portion that generates the feedback signal. The feedback portion may include a configurable feedback gain section that may provide the feedback signal with a configurable gain. The configurable feedback gain section may permit a detection performance of the detector to be enhanced according to one or more performance aspects. The configurable feedback gain section may be configured or reconfigured via an operative link to a feedback gain interface.

In some embodiments of the invention, the detector may include an equalizer. The equalizer may fitter interference from a phase signal. Filtering interference from the phase signal may generate a filtered phase signal. The equalizer may be provided in the detector such that the equalizer does not create a risk of error propagation. For example, the equalizer may be provided to filter pre-cursor interference. The equalizer may include a filter, such as an FIR filter, or other filter. One or more filter features of the equalizer may be selected according to one or more performance aspects, received signal aspects, implementation impacts, and/or other aspects. A filter feature may Include, a tap number feature, a sampling rate feature, a tape coefficient feature, or other feature.

According to various embodiments of the invention, the detector may include a decision feedback data slicer. The decision feedback data slicer may include a feedback combination section. The feedback combination section may combine the filtered phase signal with a feedback signal to generate a combined signal. The feedback combination section may include an adder, a summer, a multiplier, an averager, or other combination sections.

The decision feedback data slicer may include a limiter. The limiter may perform one or more conversions on the combined signal to generate a preliminary detected signal. A conversion may include a conversion to a purely binary signal wherein each symbol in a symbol string associated with the phase signal may be represented as a single binary symbol, such as, a 1, a 0, a high, a low, or another binary symbol, or other conversions.

The decision feedback data slicer may include a detected signal delay section. The detected signal delay section may delay the preliminary detected signal to generate a detected signal.

In some embodiments of the invention, the decision feedback data slicer may include a feedback portion. The feedback portion may include a detected feedback gain section. The detected feedback gain section may receive the detected signal and may generate a detected feedback signal corresponding to the detected signal.

The feedback portion may include a filtered phase feedback signal delay section. The filtered phase feedback delay section may delay the filtered phase signal to generate a filtered phase feedback signal.

The feedback portion may include a preliminary feedback combination section. The preliminary feedback combination section may combine two or more component feedback signals to generate a preliminary feedback signal. A component feedback signal may include the detected feedback signal, the filtered phase feedback signal, or other component feedback signals. The preliminary feedback combination section may include an adder, a summer, a multiplier, an averager, or other combination sections.

The feedback portion may Include a configurable feedback gain section. The configurable feedback gain section may provide the preliminary feedback signal with a configurable gain to generate the feedback signal. The configurable feedback gain section may permit a detection performance of the detector to be enhanced according to one or more performance aspects. The configurable feedback gain section may be configured or reconfigured via an operative link to a feedback gain interface.

DETAILED DESCRIPTION OF THE DRAWINGS

Figure 1:
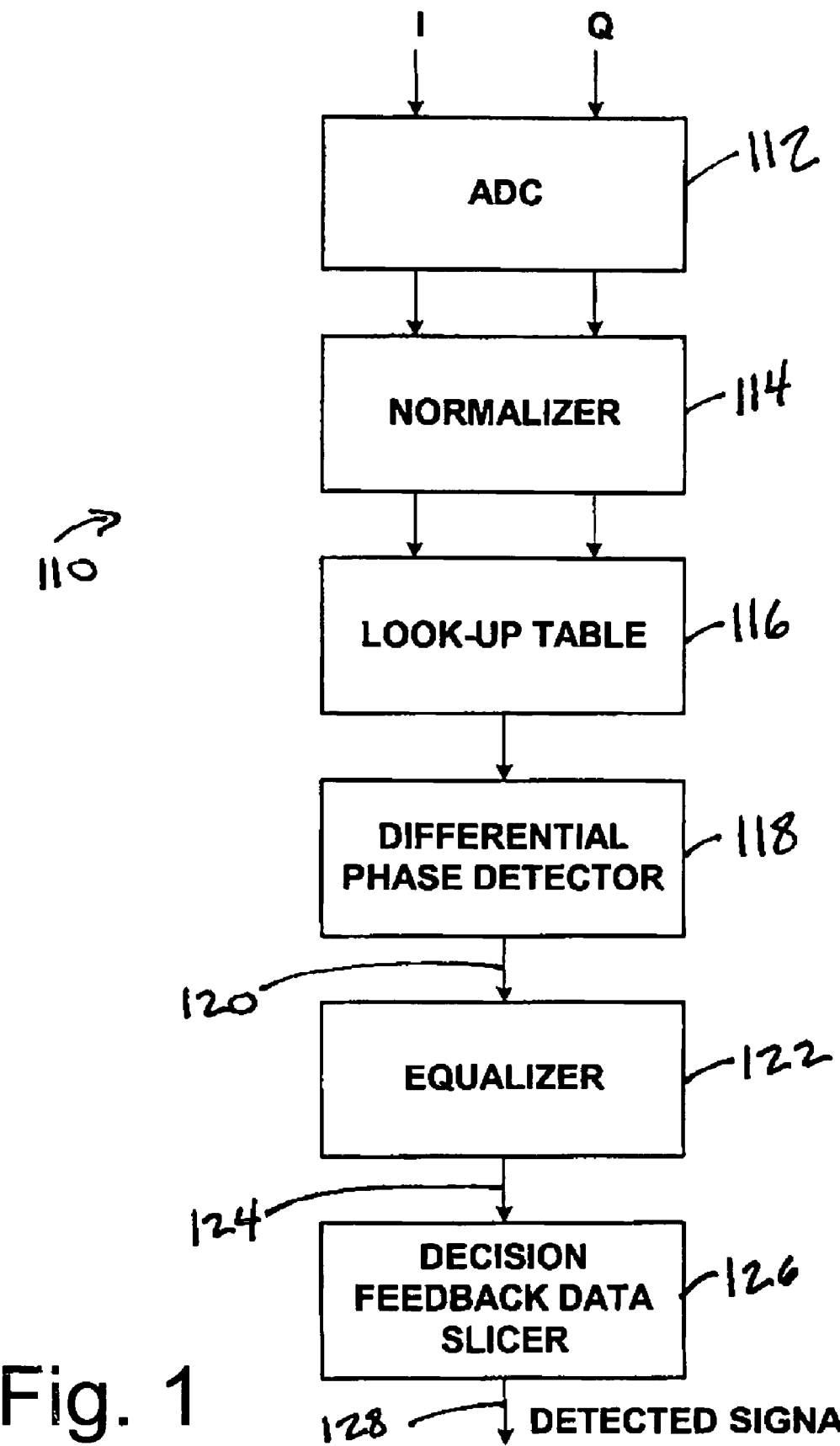
FIG. 1 illustrates an exemplary embodiment of a detector.

FIG. 1 illustrates an exemplary embodiment of a detector 110 for detecting a received signal according to a GFSK/GMSK modulation scheme. The received signal may represent a string of symbols. The received signal may include an I component and a Q component. The received signal may be fed through one or more analog-to-digital converters ("ADC") 112. ADC 112 may digitally quantify the I and Q components of the received signal. The quantified I and Q components may then be normalized by a normalizer 114. The normalized I and Q components may then be converted to a phase value. This conversion may take place in a look-up table 116. Look-up table 116 may include an arctangent ROM table, or other look up tables. The detector may include a differential phase detector 118. Differential phase detector 118 may convert the phase values generated by look-up table 116 into a phase signal 120 associated with the phase differential between consecutive symbols in the symbol string represented by the received signal.

In some embodiments of the invention, phase signal 120 may be received by an equalizer 122. Equalizer 122 may filter interference, such as ISI, or other interference, from phase signal 120. By filtering interference from phase signal 120, equalizer 122 may generate a filtered phase signal 124. Filtered phase signal 124 may be received by a decision feedback data slicer 126. Decision feedback data slicer 126 may generate a detected signal 128. Detected signal 128 may include a binary signal wherein each symbol in the symbol string represented by the received signal may be represented as a single binary symbol, such as, a 1, a 0, a high, a low, or another binary symbol.

Figure 2:
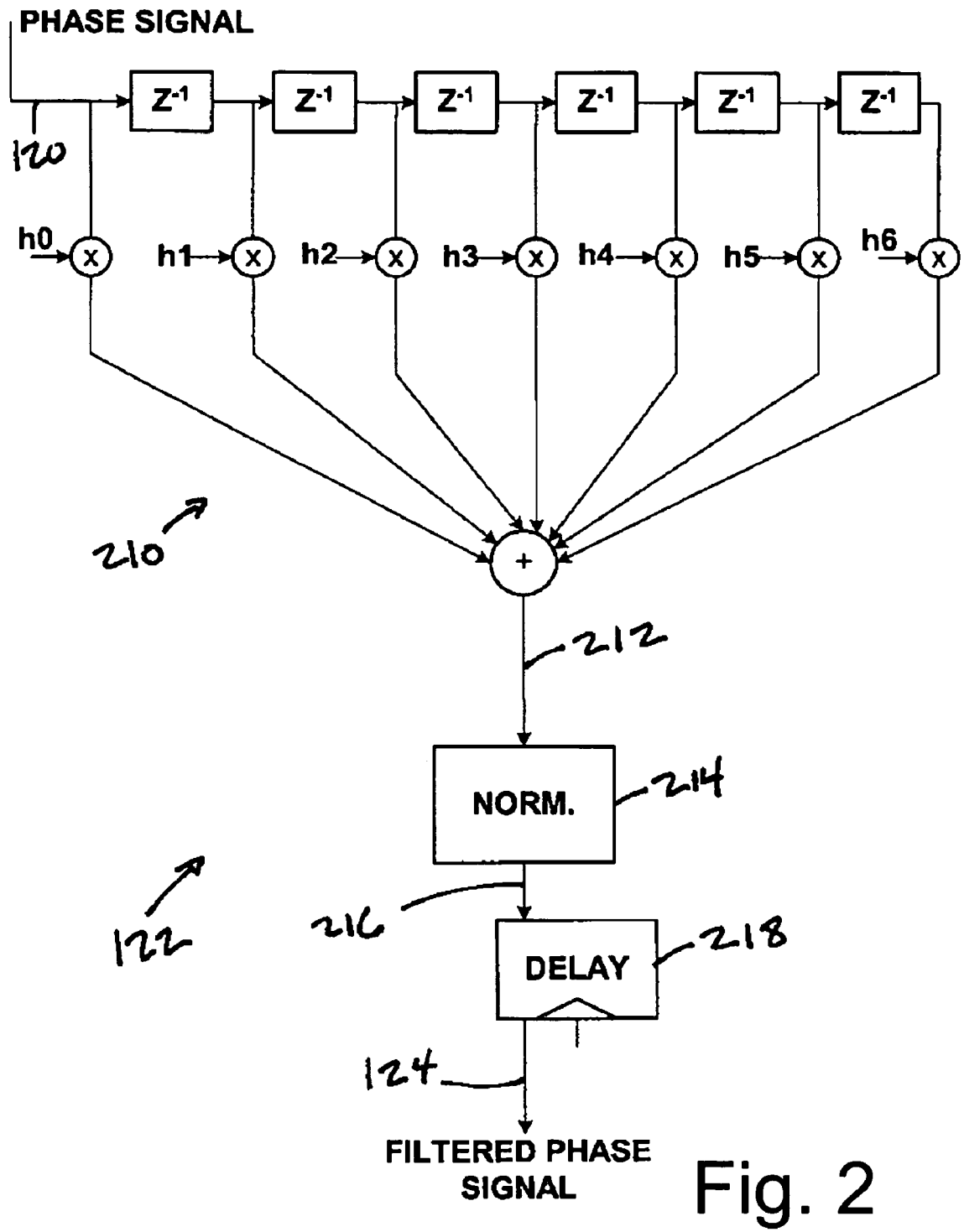
FIG. 2 illustrates a block-diagram of an exemplary embodiment of an equalizer.

FIG. 2 illustrates a block diagram of an exemplary embodiment of equalizer 122. Equalizer 122 may be provided in detector 110 such that equalizer 122 does not create a risk of error propagation. For example, equalizer 122 may be provided upstream from decision feedback data slicer 126 to filter pre-cursor interference.

In some embodiments, equalizer 122 may include a filter 210, such as an FIR filter, or other filters. Filter 210 may receive phase signal 120 and generate a preliminary filtered phase signal 212. One or more filter features of filter 210 may be configured according to one or more performance aspects, received signal aspects, implementation impacts, or other aspects. A filter feature may include a sampling rate feature, a tap number feature, a tape coefficient feature, or other features.

Equalizer 122 may include a normalizer 214. Normalizer 214 may receive preliminary filtered phase signal 212 and may normalize preliminary filtered phase signal 212 to generate a normalized preliminary filtered phase signal 216.

Equalizer 122 may include an equalizer delay section 218. Equalizer delay section 218 may delay normalized preliminary filtered phase signal 216 to generate filter phase signal 124. Depending on the filter features of filter 210, filter 210 may delay phase signal 120 while generating preliminary filtered phase signal 212 by a filter delay amount. Equalizer delay section 218 may be configured to delay normalized preliminary phase signal 216 by a delay amount such that the filter delay amount plus the delay amount equal an integer multiple of a symbol period of phase signal 120.

For example, in the exemplary embodiment illustrated filter 210 may be configured for use in a Bluetooth compliant system. In such embodiments, filter 210 may include a seven tap filter and may sample at a sampling rate four times the symbol rate of phase signal 120. This may produce a filter delay amount of three quarters of the symbol period of phase signal 120. In such embodiments, the delay amount may be one quarter of the symbol period of phase signal 120. This may produce a total delay associated with equalizer 122 of one symbol period.

Figure 3:
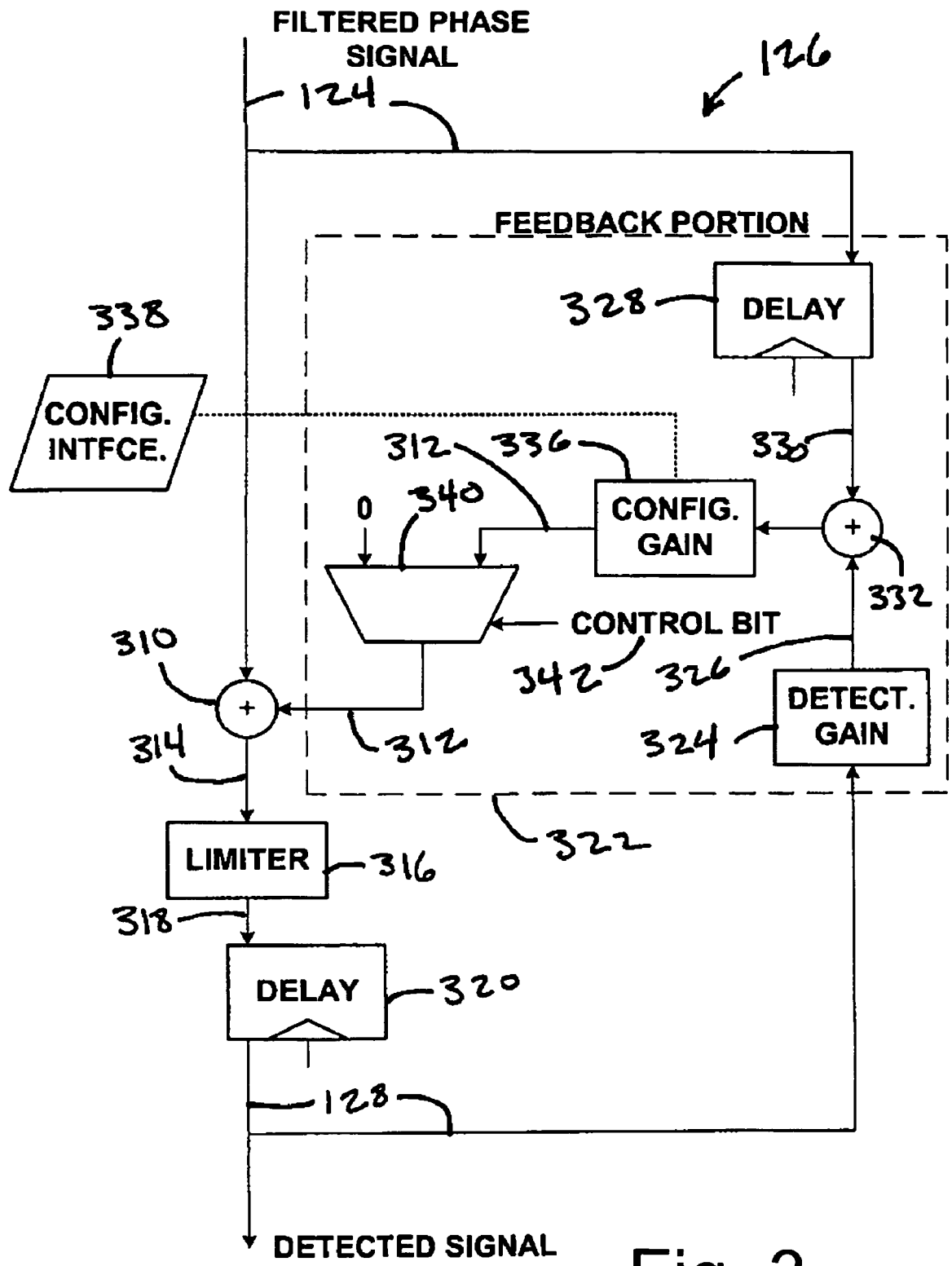
FIG. 3 illustrates a block diagram of an exemplary embodiment of a decision feedback data slicer.

FIG. 3 illustrates a block diagram of an exemplary embodiment of decision feedback data slicer 126. Decision feedback data slicer 126 may include a feedback combination section 310. Feedback combination section 310 may combine filtered phase signal 124 with a feedback signal 312 to generate a combined signal 314. Feedback combination section 310 may include an adder, a summer, a multiplier, an averager, or other combination sections.

Decision feedback data slicer 126 may include a limiter 316. Limiter 316 may perform one or more conversions on combined signal 314 to generate a preliminary detected signal 318. A conversion may include a conversion to a purely binary signal wherein each symbol in the symbol string associated with phase signal 120 may be represented as a single binary symbol, such as, a 1, a 0, a high, a low, or another binary symbol, or other conversion.

Decision feedback data slicer 126 may include a detected signal delay section 320. Detected signal delay section 320 may delay preliminary detected signal 318 to generate detected signal 128.

In some embodiments of the invention, decision feedback data slicer 126 may include a feedback portion 322. Feedback portion 322 may include a detected feedback gain section 324. Detected feedback gain section 324 may receive detected signal 128 and may generate a detected feedback signal 326 corresponding to detected signal 128. Detected feedback signal 326 may be a binary signal wherein one binary state may be a signal associated with a gain constant, and the other binary state may be a signal associated with minus the gain constant, or, the gain constant multiplied by −1. In embodiments of the invention where detected signal 128 may be a binary signal, the binary state of detected feedback signal 326 may depend on the binary state of detected signal 128.

In some embodiments of the invention, when the binary state of detected signal 128 is low, detected feedback signal 326 may be a signal associated with the gain constant, and when the binary state of detected signal 128 is high, detected feedback signal 326 may be a signal associated with minus the gain constant. The gain constant may be related to one or more received signal aspects of the received signal, such as a modulation index, or other aspects. For example, the gain constant may be equal to the modulation index. In systems where the received signal may include a variable modulation index, such as a Bluetooth compliant system, or other systems, the gain constant may be equal to a median value of the variable modulation index.

Feedback portion 322 may include a filtered phase feedback signal delay section 328. Filtered phase feedback delay section 328 may delay filtered phase signal 124 to generate a filtered phase feedback signal 330.

Feedback portion 322 may include a preliminary feedback combination section 332. Preliminary feedback combination section 332 may combine two or more component feedback signals to generate a preliminary feedback signal 334. A component feedback signal may include detected feedback signal 326, filtered phase feedback signal 330, or other component feedback signal. Preliminary feedback combination section 332 may include an adder, a summer, a multiplier, an averager, or other combination sections.

Feedback portion 322 may include a configurable feedback gain section 336. Configurable feedback gain section 336 may provide preliminary feedback signal 334 with a configurable gain to generate feedback signal 312. Configurable feedback gain section 336 may permit a detection performance of detector 110 to be enhanced according to one or more performance aspects. A performance aspect may include an ISI aspect, an AWGN aspect, a co-channel interference aspect, a sensitivity aspect, an error propagation aspect, or other aspects.

In some embodiments of the invention, configurable feedback gain section 336 may be configured or reconfigured to enhance one or more particular performance aspects. The enhancement of the particular performance aspects may affect, adversely or otherwise, one or more related performance aspects that may be related to the particular performance aspects. Configurable feedback gain section 336 may be configured or reconfigured according to a current application of detector 110. An application of detector 110 may include a voice application, a data application, a long-range application, a short-range application, or other applications.

According to various embodiments of the invention, detector 110 may Include a feedback gain interface 338. Configurable feedback gain section 336 may be configured or reconfigured via an operative link to feedback gain interface 338.

In some embodiments of the invention, feedback portion 322 may include a feedback switch 340. Feedback switch 340 may be controlled by a control bit 342 to disable feedback portion 322 of decision feedback data slicer 126. For example, feedback portion 322 may be disabled until a synchronization with the received signal is achieved, and exact frame boundaries may be determined, or for other purposes.

What is claimed is:

1. A detector for detecting a received signal according to a Gaussian shift keying modulation scheme wherein successive symbols are modulated by changes in phase of a carrier signal, the detector comprising:

a differential phase detector, the differential phase detector producing a differential phase signal representing a change in phase between a previous symbol and a next symbol;

an equalizer, the equalizer producing a filtered phase signal signal by filtering inter-symbol interference from the differential phase signal; and a decision feedback data slicer, the decision feedback data slicer producing an output decision signal representing successive detected symbols in response to the filtered phase signal, the decision feedback data slicer comprising:

a first combiner, the first combiner producing a feedback signal by combining the filtered phase signal representing a change in phase between the previous symbol and the next symbol with a gain constant, the gain constant defined by a value having a sign corresponding to a sign of the previous symbol as represented by the output decision signal; and a second combiner, the second combiner producing a preliminary detected signal by combining the filtered phase signal representing a change in phase between the previous symbol and the next symbol with the feedback signal, wherein the decision feedback data slicer produces an output decision signal representing the next symbol in response to the preliminary detected signal.

2. The detector of claim 1 wherein the decision feedback data slicer further includes a configurable feedback gain section that provides the feedback signal with a configurable gain.

3. The detector of claim 2 wherein the configurable gain may be configured or reconfigured based at least in part on one or more performance aspects.

4. The detector of claim 3 wherein the configurable gain section comprises a register loadable with a scale factor to control a tradeoff between co-channel performance and additive white Gaussian noise (AWGN) performance.

5. The detector of claim 2 wherein the configurable gain may be configured or reconfigured based at least in part on a current application.

6. A method for detecting a received signal according to a Gaussian shift keying modulation scheme wherein successive symbols are modulated by changes in phase of a carrier signal, the method comprising:

producing a differential phase signal representing a change in phase between a previous symbol and a next symbol;

producing a filtered phase signal by filtering inter-symbol interference from the differential phase signal using a decision feedback equalizer; and producing an output decision signal representing successive detected symbols in response to the filtered phase signal, wherein the output decision signal is produced by:

producing a feedback signal by combining the filtered phase signal representing a change in phase between the previous symbol and the next symbol with a gain constant, the gain constant defined by a value having a sign corresponding to a sign of the previous symbol as represented by the output decision signal; and producing a preliminary detected signal by combining the filtered phase signal representing a change in phase between the previous symbol and the next symbol with the feedback signal, wherein the decision feedback data slicer produces an output decision signal representing the next symbol in response to the preliminary detected signal.

7. The method of claim 6 further comprising applying a configurable gain to the feedback signal.

8. The method of claim 7 wherein the configurable gain is configured or reconfigured based at least in part on one or more performance aspects.

9. The method of claim 8 wherein the configurable gain corresponds to a selected tradeoff between co-channel performance and additive white Gaussian noise (AWGN) performance.

10. The method of claim 7 wherein the configurable gain is configured or reconfigured based at least in part on a current application.

* * * * *